(12) United States Patent
Yancey

(10) Patent No.: US 11,722,319 B1
(45) Date of Patent: Aug. 8, 2023

(54) SCHEDULED SYNCHRONIZATION OF A DATA STORE WITH CERTIFICATE REVOCATION LISTS INDEPENDENT OF CONNECTION REQUESTS

(71) Applicant: Amazon Technologies, Inc., Seattle, WA (US)

(72) Inventor: Justin Paul Yancey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 752 days.

(21) Appl. No.: 16/584,845

(22) Filed: Sep. 26, 2019

(51) Int. Cl.
*H04L 9/32* (2006.01)
*G06F 16/22* (2019.01)
*G06F 16/27* (2019.01)

(52) U.S. Cl.
CPC ......... *H04L 9/3268* (2013.01); *G06F 16/2282* (2019.01); *G06F 16/27* (2019.01)

(58) Field of Classification Search
CPC ...... H04L 9/3268; G06F 16/2282; G06F 16/27
See application file for complete search history.

(56) References Cited

U.S. PATENT DOCUMENTS

| | | | | |
|---|---|---|---|---|
| 6,128,740 | A * | 10/2000 | Curry et al. | H04L 63/0428 705/76 |
| 8,103,876 | B2 * | 1/2012 | Little et al. | H04L 51/00 726/10 |
| 10,374,809 | B1 * | 8/2019 | Dasarakothapalli et al. | H04L 9/30 |
| 2009/0187983 | A1 * | 7/2009 | Zerfos et al. | H04W 12/069 726/10 |
| 2010/0325429 | A1 * | 12/2010 | Saha et al. | H04L 9/3268 713/158 |

* cited by examiner

*Primary Examiner* — Mohammed Waliullah
(74) *Attorney, Agent, or Firm* — Robert C. Kowert; Kowert, Hood, Munyon, Rankin & Goetzel, P.C.

(57) ABSTRACT

A certificate revocation manager performs scheduled synchronization of a certificate revocation table with certificate revocation lists (CRLs) independent of connection requests from clients. The certificate revocation table includes entries that each indicate a client certificate that has been revoked by a certificate authority (CA). On a scheduled basis, the certificate revocation manager synchronizes the entries of the certificate revocation table with current CRLs obtained from different CAs. When a service at receives a request from a client to establish a connection, the service generates a composite key based on a CA identifier and a certificate identifier of a client certificate provided by the client. The service performs a lookup on the certificate revocation table based on the composite key. Based on a result of the lookup, the certificate revocation manager determines whether the client certificate is revoked.

20 Claims, 7 Drawing Sheets

SCHEDULED SYNCHRONIZATION OF A DATA STORE WITH CERTIFICATE REVOCATION LISTS INDEPENDENT OF CONNECTION REQUESTS

BACKGROUND

In order to establish a secure connection session with a remote client, an application running on a server (e.g., at a service provider) may require the remote client to provide a client certificate (e.g., X.509 certificate) that has been issued to the client by a trusted certificate authority (CA). For example, when a service provider receives a request from the client to establish a connection session using a secure communication protocol (e.g., transport layer security (TLS)), a service may request a client certificate from the client and verify the digital signature of the CA that issued the client certificate to the client.

As part of the authentication process for a certificate-based connection, the service may download a certificate revocation list (CRL) from the CA that issued the client certificate. If the CRL indicates that the client certificate provided by the client has been revoked, then the service provider may reject the connection request from the client. If the client certificate is not listed in the CRL, then the service provider may allow the connection request. Downloading a CRL to check a client certificate's revocation may take a relatively long time and therefore may introduce a performance bottleneck in various applications. Moreover, certificate revocation checks can add significant latency to multi-region services, since they may introduce a cross-region call to check the certificate's revocation status.

Figure 1:
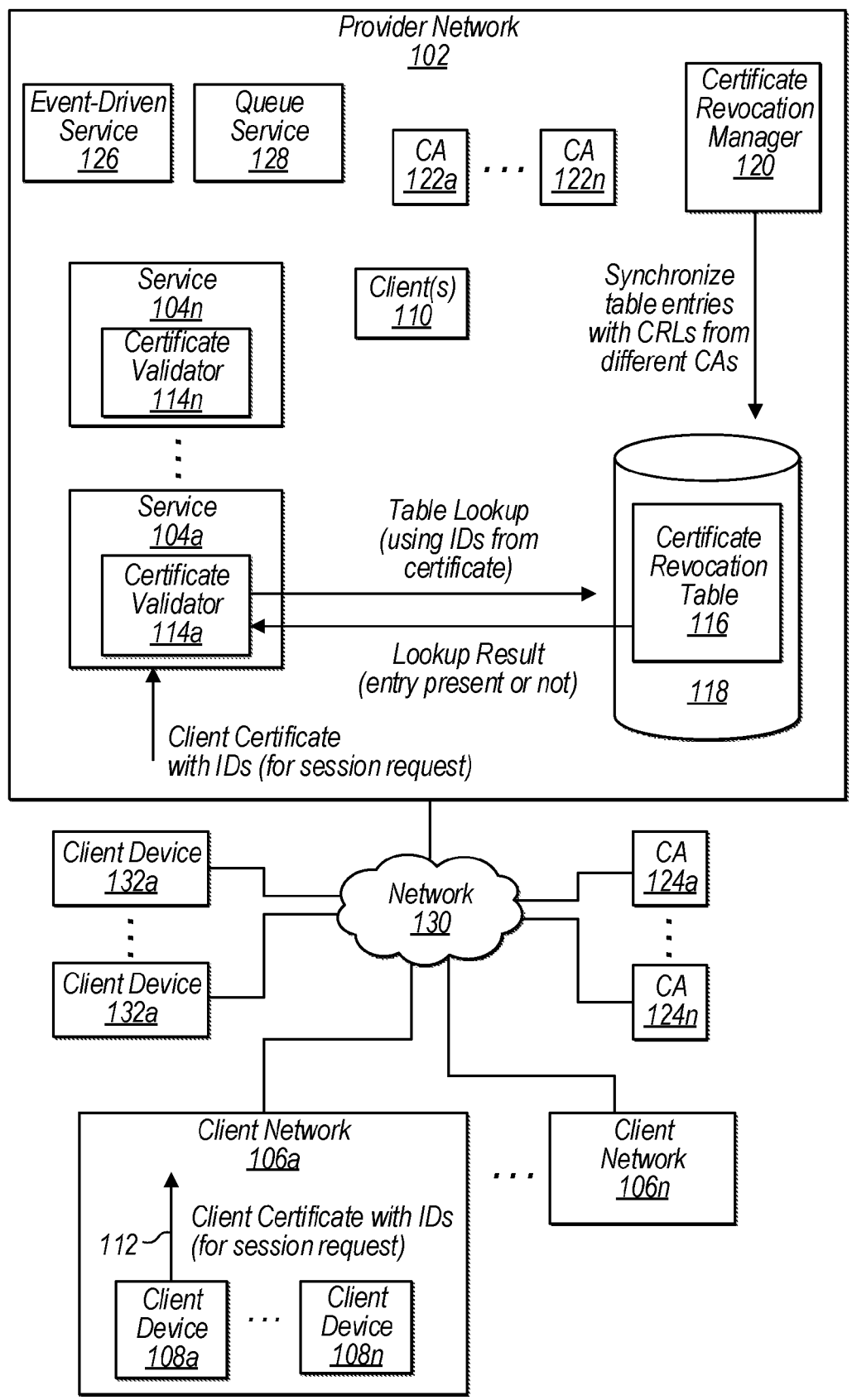
FIG. 1 illustrates a system for scheduled synchronization of a data store with certificate revocation lists independent of connection requests from clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for scheduled synchronization of a data store with certificate revocation lists independent of connection requests from clients. In embodiments, a provider network may store a certificate revocation table with entries that each indicate a client certificate that has been revoked by a CA that issued the client certificate. On a scheduled basis (e.g., periodically such as once every 15 minutes, or in response to detection of certain events or states), the certificate revocation manager of the provider network may obtain one or more current CRLs and/or synchronize the entries of the certificate revocation table with current CRLs obtained from different CAs.

When a given service at the provider network receives a request from a client to establish a connection (e.g., according to a certificate-based connection protocol such as TLS), the certificate revocation manager may obtain, from the client certificate (e.g., an X.509 public key certificate), a CA identifier (e.g., CA name) of the CA that issued the certificate and another identifier (e.g., a certificate serial number or other certificate identifier). The service may then generate a composite key based at least on the CA identifier and the other identifier and perform a lookup on the certificate revocation table based on the composite key. Based on a result of the lookup, the certificate revocation manager may determine whether the client certificate is revoked.

In embodiments, if the result of the lookup indicates that a matching entry in the certificate revocation table was found, then the service may determine that the client certificate is revoked. If no entry was found, then the service may determine that the client certificate is not revoked. In some embodiments, in response to determining that the client certificate is revoked or is not revoked, the service may send to an endpoint (e.g., request processing logic for the service or another service) an indication that the client certificate is revoked/invalid or not revoked/valid. The service may then reject or accept the request to establish the connection.

In some embodiments, even though a service (e.g., request processing logic) receives an indication that the certificate is revoked and/or is invalid, the request processing logic may continue processing the request to establish a connection (e.g., by prompting the requester for additional authentication credentials). In various embodiments, any number of other actions may also be performed by the provider network to validate/accept or invalidate/reject the client certificate.

The schedule of obtaining the current CRLs from the CAs and synchronizing the entries of the certificate revocation table may occur independent of the client requests to establish connections. Instead of requiring a service to download a current CRL to process a request to establish a connection, the service may simply perform a lookup on the certificate revocation table to determine whether the certificate has been revoked. Therefore, the service relies on the certificate revocation table instead of a downloaded CRL as the source of truth for certificate revocation status. This may considerably reduce latency to process connection requests, because performing a table lookup on a local certificate revocation table may take much less time than downloading and processing a CRL. Therefore, embodiments improve the performance of services by reducing request processing time.

FIG. 1 illustrates a system for scheduled synchronization of a data store with certificate revocation lists independent of connection requests from clients, according to some embodiments. In embodiments, the provider network 102, the services 104, the client networks 106, and/or any other components depicted in FIG. 1 may be the same as or include one or more of the same components as the provider network, services, client networks, and/or any other components depicted in any of FIGS. 2-6. FIG. 7 depicts an example computer system(s) that may implement the provider network, services, client networks, and/or any other components depicted in any of FIGS. 1-6.

In embodiments, a client 108 (e.g., client device 108a) may send a request to a service 104 (e.g., service 104a) of the provider network to establish a connection (e.g., to access/use one or more functions of the service such as data computation and/or data storage/access functions). In various embodiments, the client 108 may be an application and/or a computing device external to the provider network 102 (e.g., client device 108a at a remote client network 106a). In some embodiments, the client may be within the provider network 102 (e.g., client 110, which may be a service/application or computing device).

In response to receiving the request to establish a connection, the service may process the request to determine whether to accept or reject the request in accordance with a certificate-based connection protocol. In embodiments, another service of the provider network may perform some or all of the functionality described herein to process a given request to connect to the service. For example, the service may redirect the client to another request-processing service in response to receiving the request to establish a connection (e.g., by providing a response to a client web browser that includes a URL address/endpoint for the other request-processing service).

In the illustrative embodiment, the service 104 may obtain a client certificate from the client 108. For example, the service 104 may request a client certificate form the client 108 and in response, the client 108 may send the client certificate to the service 104 (e.g., client certificate 112). In some embodiments, the client 108 may send the client certificate as part of the request to establish a connection. After the service obtains the client certificate 112, the service 104 may process the client certificate to determine whether or not the client certificate 112 is valid (e.g., using a certificate validator 114).

As part of the process to validate a client certificate (e.g., client certificate 112), the certificate validator 114 may perform a lookup on a certificate revocation table 116 of a data store 118 based on information that uniquely identifies the client certificate. In embodiments, the certificate validator 114 obtains, from a client certificate provided by the client, a CA identifier of a CA that issued the client certificate and another identifier (e.g., a certificate serial number or other certificate identifier).

In embodiments, the certificate validator 114 generate a composite key based at least on the CA identifier and the certificate identifier. The certificate validator 114 may then perform a lookup on the certificate revocation table based on the composite key. Based on the result of the lookup, the certificate validator 114 may determine whether the client certificate is revoked. If the result of the lookup indicates that a matching entry in the certificate revocation table was found, the certificate validator 114 may determine that the client certificate is revoked. If the result of the lookup indicates that a matching entry in the certificate revocation table was not found (e.g., no table entries returned for the lookup), the certificate validator 114 determine that the client certificate is not revoked.

In the depicted embodiment, a certificate revocation manager 120 may obtain (e.g., download) the current CRLs from any number of CAs 122 (e.g., CAs of the provider network and/or CAs 124 of remote networks) and/or synchronize the entries of the certificate revocation table 116 according to a schedule (e.g., a periodic schedule such as every 15 minutes, every 24 hours, etc.). In embodiments, the schedule of obtaining the current CRLs from the CAs 122 and/or synchronizing the entries of the certificate revocation table 116 according to a schedule may occur independent of requests from clients 108 to establish connections (e.g., regardless of whether or not the certificate validator performs one, two, or any other number of lookups on the certificate revocation table 116 in between the scheduled obtaining of current CRLs and/or synchronization of the entries of the certificate revocation table 116).

As shown, the certificate revocation manager 120 may perform for each of one, two, or any number of the CAs 122, according to a synchronization schedule: obtaining a current CRL from the CA and synchronizing the entries of the certificate revocation table with the current CRL obtained from the CA. In embodiments, to synchronize entries for the certificate revocation table with the current CRL obtained from a particular CA, the certificate revocation manager 120 may determine that the certificate revocation table has not been synchronized with the current CRL and in response, cause one or more entries for one or more respective revoked certificates indicated by the CRL to be inserted into the certificate revocation table.

In embodiments, the certificate revocation manager 120 may determine, based at least on comparison of a timestamp or a version number in the current CRL with another timestamp or another version number in the certificate revocation table (e.g., stored in one or more entries that revoked certificates indicated by CRLs previously downloaded from the CA), that the certificate revocation table has not been synchronized with the current CRL. For example, if a the timestamp or the version number in the current CRL does not match the other timestamp or the other version number in the certificate revocation table (e.g., the CRL timestamp indicates a more recent time or the CRL version number indicates a newer version), then the certificate revocation manager 120 may determine that the certificate revocation table has not been synchronized with the current CRL. Otherwise, the certificate revocation manager 120 may determine that the certificate revocation table has been synchronized with the current CRL.

In some embodiments, the provider network 102 includes an event-driven service 126 and/or a queue service 128. The event-driven service 126 may detect different events and execute/invoke different functions in response to the detection of the events to perform any of the actions described herein (e.g., to perform various tasks to synchronize entries in the certificate revocation table). For example, the event-driven service may detect that another period of time has elapsed (e.g., 15 minutes) and in response, execute a function that downloads a current CRL from one or more CAs for processing by the certificate revocation manager. In various embodiments, any of the functions performed by the certificate revocation manager or other services may instead be performed by one or more functions registered with the event-driven service in response to detection of one or more pre-defined events.

In embodiments, to synchronize entries of the certificate revocation table with a current CRL obtained from a CA, the certificate revocation manager 120 may determine one or more revoked certificates indicated by the current CRL that are not indicated by the certificate revocation table (e.g., using a "diff" function to determine differences between the CRL entries and the table entries). In embodiments, the event-driven service may detect that the CRL was obtained (e.g., downloaded by another event driven function executed according to a schedule) from the CA and in response, execute the "diff" function to determine the new entries that need to be added to the certificate revocation table. In some embodiments, the same function may perform the downloading of the current CRL, the determining of the new entries, and/or adding the new entries to a queue service (e.g., a queue provided by the queue service).

In embodiments, any of the client devices 108, 110, 124 may be considered an internet-of-things (IoT) device. The Internet of Things (IoT) may refer to the interconnection of computing devices scattered around the globe within the existing internet infrastructure. In embodiments, IoT devices may be used for a variety of consumer and industrial applications (e.g., smart phones, environmental sensors, controllers, etc.). In some embodiments, one or more client devices (e.g., client device 108a) may serve as a hub device. For example, the hub device may collect data from one more other devices on the client network and in response, send a request to a service (e.g., service 104a) to establish a connection.

In some embodiments, the certificate revocation manager 120 (or the "diff" function) may send the respective entries for the one or more revoked certificates to a queue service, wherein the queue service inserts the respective entries into a queue maintained by the queue service (e.g., a first-in first-out queue). Therefore, the queue may collect numerous entries for revoked certificates from one or more different CRLs obtained from one or more different CAs.

In various embodiments, the event-driven service (or the certificate revocation manager 120) may execute, based the entries in the queue and/or other criteria, an insertion function. For example, the event-driven service may detect that the number of entries in the queue has exceeded a threshold number and in response, select/determine one or more of the entries to be inserted into the certificate revocation table (e.g., a fixed number such as 10 entries). In embodiments, the insertion function may select/determine the number of the entries to be inserted into the certificate revocation table, such that a load on the table will remain below a threshold amount and/or to maintain a minimum performance level of the table (e.g., query response time for lookups).

To determine the number of entries needed to cause the table to remain below a threshold load and/or to maintain a minimum performance level, the insertion function may determine one or more of the current load, predicted load, current performance level, or predicted performance level, and then select the number of entries based on one or more of the current load, predicted load, current performance level, or predicted performance level such that the load on the table will remain below a threshold amount and/or to maintain a minimum performance level of the table (for at least a period of time). In response to selecting/determining the entries to be inserted into the certificate revocation table, the insertion function may insert the entries into the certificate revocation table.

In various embodiments, any number of other actions associated with certificate-based connection protocols may also be performed by the certificate validator or other certificate processing components of the service (or other services) to validate/accept or invalidate/reject the client certificate (e.g., if it is determined that the certificate has not been revoked). For example, the service may obtain the client certificate from the client and authenticate it based on a CA certificate stored and/or accessed by the provider network (e.g., in the data store 118).

In embodiments, the service may extract the client certificate from a request to establish a connection (or otherwise obtain the certificate) and validate or invalidate the client certificate (e.g., determine whether the client certificate was signed by a trusted CA, whether it is expired, etc.). For example, the service may identify one or more registered CA certificates or a preconfigured CA chain (e.g., obtained/downloaded by the provider network from a trusted CA) and validate the client certificate against the one or more registered CA certificates or the preconfigured CA chain.

A service may validate the client certificate based on security information associated with (e.g., included in) one or more registered CA certificates obtained/access by the service. For example, a public key included in one of the registered CA certificates that was downloaded from a trusted CA may be used to determine whether the client certificate has been signed by the same trusted CA that signed the client certificate. If so, then the client certificate may be validated. If not, then it may be invalidated.

In some embodiments, devices of the client networks 106 and any of the CAs 124 may communicate with the provider network 102 via a wide area network 130 (e.g., the internet). Therefore, in embodiments, the devices and/or client networks may be remote devices and/or client networks with respect to the provider network. Similarly, the CAs 124 may be remote CAs with respect to the provider network. In embodiments, any number of client devices 132 may exist as stand-alone devices (e.g., smart phone) and operate in the same or similar manner as described herein for the client devices 108 of client networks 106.

Figure 2:
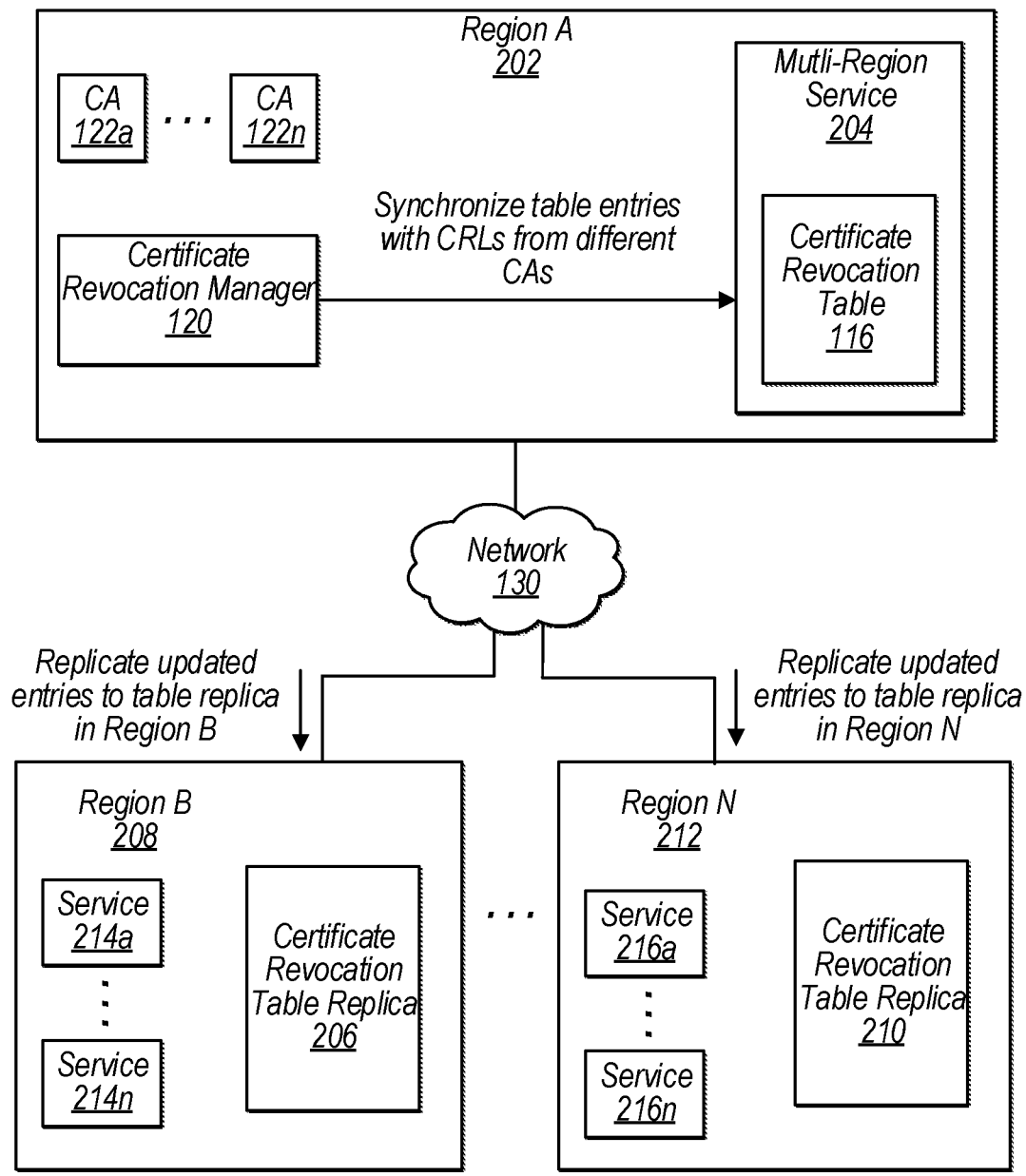
FIG. 2 illustrates performing cross-region replication of updated entries from a synchronized certificate revocation table to table replicas in other regions, according to some embodiments.

FIG. 2 illustrates performing cross-region replication of updated entries from a synchronized certificate revocation table to table replicas in other regions (e.g., from a data center in one computing infrastructure collection to another data center in another computing infrastructure collection), according to some embodiments. Cross-region replication may be used to allow services at other regions to perform local lookups on local replicas of the certificate revocation table, instead of making cross-region calls to perform lookups. This may reduce the amount of time for services in different regions to process requests from clients to establish connections.

As used herein, a region may be considered a "computing infrastructure collection." In embodiments, a computing infrastructure collection may be a physical location-based grouping and/or logical grouping of computing devices, where the computing devices are physically and/or logically separate from one or more other groups of computing devices that may each also be grouped according to physical location-based grouping and/or logical grouping. For example, one computing infrastructure collection may be a network of computing devices (e.g., servers, routers, etc.)

within a geographical area (e.g., city, county, state, country, continent, etc.) and another computing infrastructure collection may be another network of computing devices (e.g., servers, routers, etc.) within a different geographical area (e.g., a different city, county, state, country, continent, etc.).

In some embodiments, the computing devices of a computing infrastructure collection may belong to a local network and the computing devices of another computing infrastructure collection may belong to a remote network (e.g., with respect to the local network). For example, a data center located in a city or region of the U.S. (e.g., servers and/or other computing devices that belong to the same local network of the U.S. data center) may be considered a computing infrastructure collection and another data center located in a city or region of Canada (e.g., servers and other computing devices that belong to the same local network of the Canada data center) may be considered another computing infrastructure collection. In embodiments, any country, continent or other area (e.g., regions, cities, metropolitan areas, etc.) may be divided into any number of geographical areas, and each of those geographical areas may include any number of computing infrastructure collections.

As depicted, Region A 202 includes a certificate revocation manager that synchronizes table entries of the certificate revocation table 116 with current CRLs from different CAs (e.g., as described herein). As shown, a multi-region service 204 manages the certificate revocation table 116 as a "multi-region" table. In embodiments, in response to synchronization of table entries of the certificate revocation table 116 with one or more current CRLs, the multi-region service replicates the new entries of the certificate revocation table 116 to any number of different replicas (e.g., table replica 206 of Region B 208 and table replica 210 of Region 212) of the certificate revocation table. Therefore, in some embodiments the certificate revocation table serves as a "master" table.

Cross-region replication allows services at other regions (e.g., services 214 and 216) to perform local lookups on local replicas of the certificate revocation table (e.g., within the same region as the service). Therefore, a service in a remote region (e.g., Region B) may generate a composite key as described herein and perform a local lookup on the replica of the certificate revocation table based on the composite key (instead of making a cross-region call to the certificate revocation table 116). Based on the result of the local lookup, the service may determine whether the other client certificate is revoked.

In some embodiments, one or more of the other regions may include its own certificate revocation manager that synchronizes, according to a schedule, table entries of a local certificate revocation table, as described herein. In some embodiments, the certificate revocation manager for any particular region may replicate the new entries of its local certificate revocation table to any number of different replicas located in other regions. For example, after the certificate revocation table in Region B 208 is synchronized, a certificate revocation manager in Region B may replicate the new entries of its local certificate revocation table to the certificate revocation table in Region A, Region N, and any other number of regions. Therefore, any updates to a local certificate revocation table in any given region may be replicated to one or more other regions (e.g., no particular table is assigned as a master table).

Figure 3:
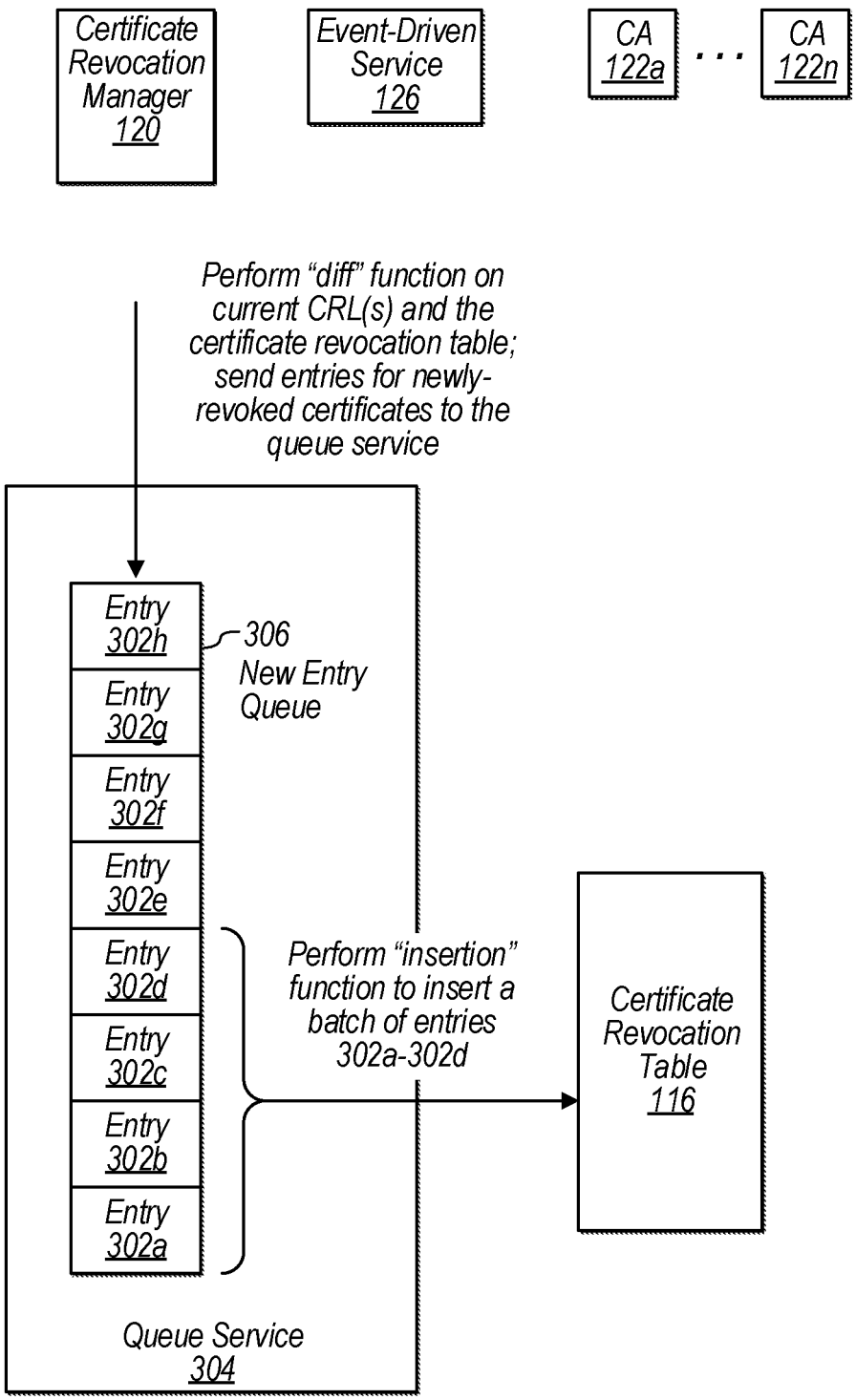
FIG. 3 illustrates sending entries for newly-revoked certificates to a queue service and executing an insertion function to insert a batch of entries of the queue into certificate revocation table, according to some embodiments.

FIG. 3 illustrates sending entries for newly-revoked certificates to a queue service and executing an insertion function to insert a batch of entries of the queue into certificate revocation table, according to some embodiments. In the depicted embodiment, to synchronize entries of the certificate revocation table with a current CRL obtained from a CA, the certificate revocation manager 120 (e.g., using a function invoked by an event-driven service) may download the current CRL and determine one or more revoked certificates indicated by a current CRL of a CA that are not indicated by the certificate revocation table (e.g., using a "diff" function as described herein).

As shown, the certificate revocation manager 120 (or the diff function) may send the respective entries 302 for the one or more revoked certificates to a queue service 304, wherein the queue service inserts the respective entries into a queue 306 maintained by the queue service (e.g., a first-in first-out queue). Over a period of time, the queue may collect numerous entries for revoked certificates from one or more different CRLs obtained from one or more different CAs. In embodiments, the certificate revocation manager 120 (or the event-driven service) may obtain the current CRL, determine the one or more revoked certificates, and/or send the respective entries 302 to the queue service according to a schedule (e.g., in response to certain types of events, triggers, or on a periodic basis).

As described herein, an event-driven service may execute, based on the entries in the queue and/or other criteria, an insertion function (e.g., in response to certain types of events, triggers, or on a periodic basis). For example, the event-driven service may detect that the number of entries in the queue has exceeded a threshold number and in response, select/determine one or more of the entries to be inserted into the certificate revocation table (e.g., entries 302a-302d). In embodiments, the insertion function may select/determine the number of the entries to be inserted into the certificate revocation table, such that a load on the table will remain below a threshold amount and/or to maintain a minimum performance level of the table (e.g., query response time for lookups). For example, the insertion function may determine that 20 entries may be inserted while still maintaining a minimum threshold response time for entry lookups.

To determine the number of entries needed to cause the table to remain below a threshold load and/or to maintain a minimum performance level, the insertion function may determine one or more of the current load, predicted load, current performance level, or predicted performance level, and then select the number of entries based on one or more of the current load, predicted load, current performance level, or predicted performance level such that the load on the table will remain below a threshold amount and/or to maintain a minimum performance level of the table (for at least a period of time). In response to selecting/determining the entries to be inserted into the certificate revocation table, the insertion function may insert the entries (e.g., entries 302a-302d) into the certificate revocation table. In various embodiments, one or more of the functions described herein to download and synchronize the current CRLs with the certificate revocation table may be performed by the certificate revocation manager and/or performed by one or more functions of the event-driven compute service (e.g., in response to pre-defined events that invoke/execute respective functions registered with the event-driven compute service).

Figure 4:
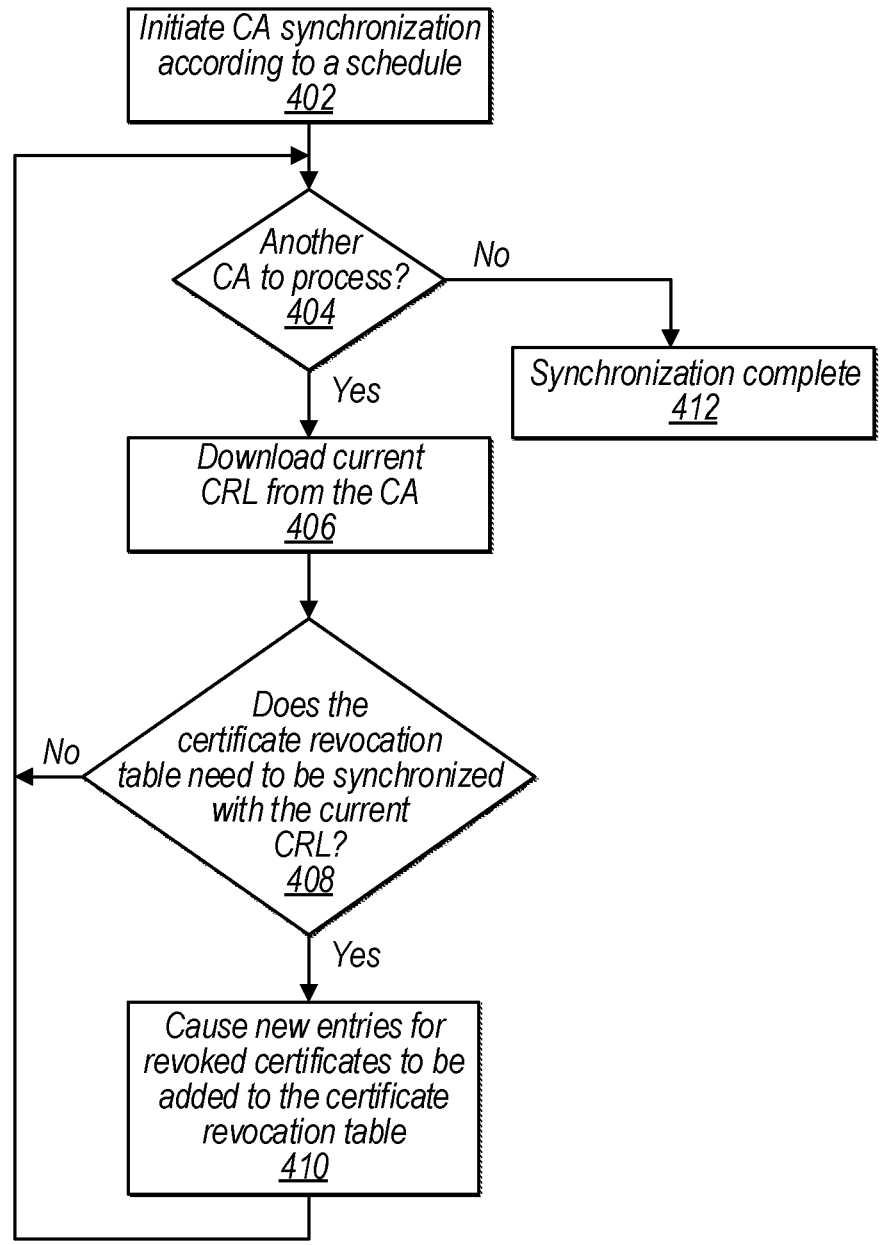
FIG. 4 is a flow diagram that illustrates scheduled synchronization of a data store with certificate revocation lists independent of connection requests from clients, according to some embodiments.

FIG. 4 is a flow diagram that illustrates scheduled synchronization of a data store with certificate revocation lists independent of connection requests from clients, according to some embodiments. At block 402, the certificate revocation manager may initiate and/or perform CA synchronization (e.g., synchronize the entries of the certificate revocation table with one or more current CRLs from one or more CAs) according to a schedule.

At block 404, the certificate revocation manager determines if there is another CA to process (e.g., to obtain a CRL from and to synchronize entries with the certificate revocation table). If the certificate revocation manager determines there is another CA to process, then at block 406, the certificate revocation manager obtains a current CRL from the CA.

At block 408, the certificate revocation manager determines whether the certificate revocation table needs to be synchronized with the current CRL. If so, then at block 410, the certificate revocation manager causes the new entries for revoked certificates to be added to the certificate revocation table. In embodiments, this may include sending the new entries to a queue service, where they eventually are inserted into the certificate revocation table.

If the certificate revocation manager determines that the certificate revocation table does not need to be synchronized with the current CRL, then the process returns to block 404. At block 404, if the certificate revocation manager determines there is not another CA to process, then at block 412, the synchronization process is complete.

Figure 5:
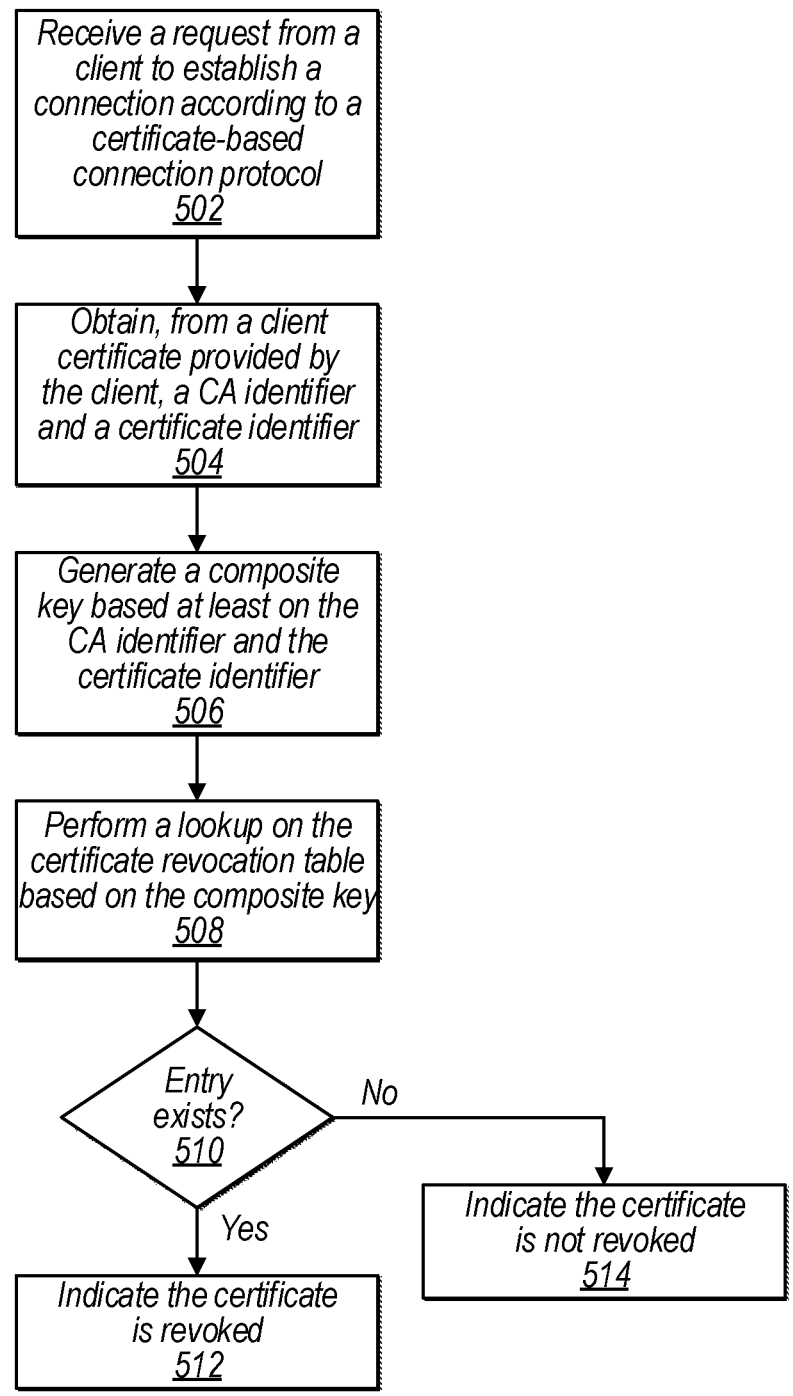
FIG. 5 is a flow diagram that illustrates determining whether a client certificate is revoked based on performing a lookup on a certificate revocation table using a certificate-based composite key, according to some embodiments.

FIG. 5 is a flow diagram that illustrates determining whether a client certificate is revoked based on performing a lookup on a certificate revocation table using a certificate-based composite key, according to some embodiments. At block 502, a service receives a request from a client to establish a session according to a certificate-based connection protocol.

At block 504, the service obtains, from a client certificate provided by the client, a CA identifier and a certificate identifier. At block 506, the service generates a composite key that includes the CA identifier and the certificate identifier. In some embodiments, the composite key may also include one or more additional identifiers obtained from the certificate.

At block 508, the service performs a lookup on the certificate revocation table using the composite key. At block 510, the service determines whether an entry exists (e.g., an entry that includes and/or matches the composite key). If so, the service determines that an entry exists (e.g., an entry was returned by the lookup), then at block 512, the service determines and/or indicates that the certificate is revoked. If not, then at block 514, the service determines and/or indicates that the certificate is not revoked.

Figure 6:
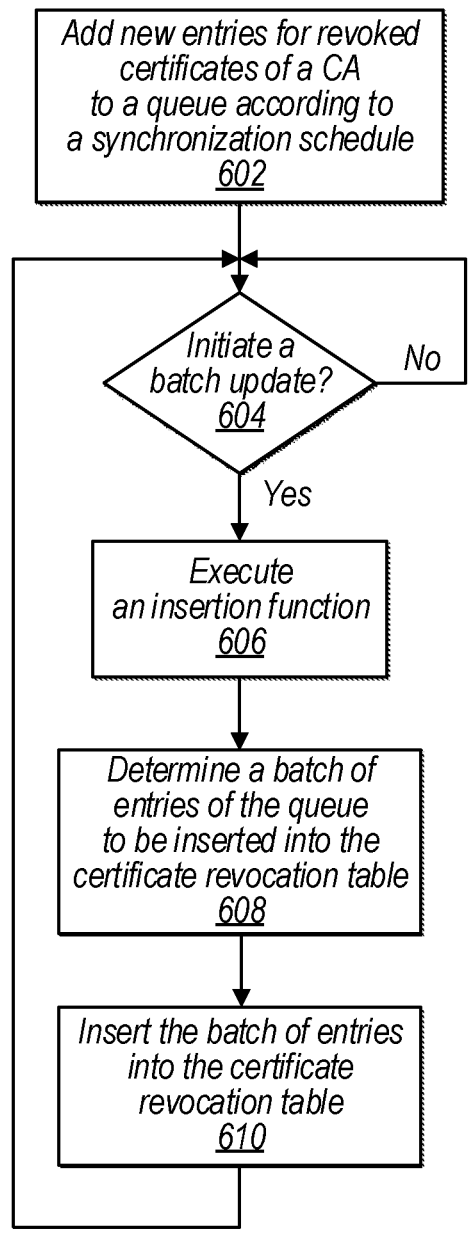
FIG. 6 is a flow diagram that illustrates adding entries for newly-revoked certificates to a queue and synchronizing a batch of entries of the queue with a certificate revocation table, according to some embodiments.
Figure 7:
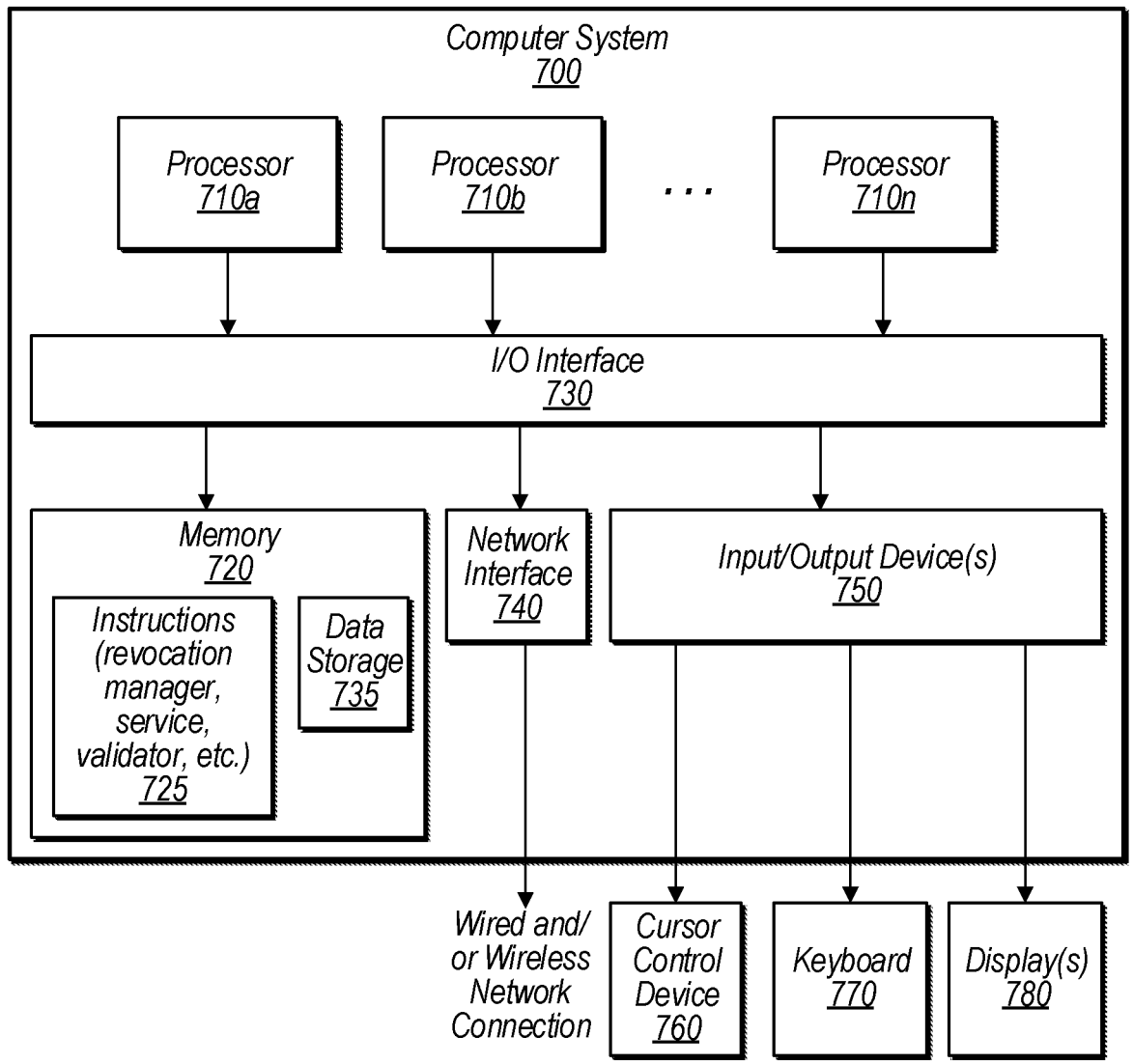
FIG. 7 is a block diagram illustrating an example computer system that implements some or all of the techniques described herein, according to some embodiments.

FIG. 6 is a flow diagram that illustrates adding entries for newly-revoked certificates to a queue and synchronizing a batch of entries of the queue with a certificate revocation table, according to some embodiments. At block 602, the certificate revocation manager (or one or more event-driven functions) adds new entries for revoked certificates of a CA to a queue service according to a synchronization schedule. For example, in response to obtaining a current CRL from a CA (e.g., downloading the current CRL or otherwise receiving the current CRL), an event-driven function (e.g., a diff function) may be invoked that determines any new entries that need to be added to a queue and then adds the entries to the queue.

At block 604, an event-driven service determines, based on the entries in the queue and/or other criteria, whether to initiate a batch update (e.g., whether to execute an insertion function to insert one or more of the entries from the queue into the certificate revocation table).

In embodiments, if the event-driven service detects an event and/or condition based on the entries in the queue and/or other criteria as described herein, then at block 606, the event-driven service executes the insertion function. In various embodiments, block 602 occurs independent of block 604. In other words, new entries may be continually added to the queue according to one schedule and the event-driven service may cause entries to be inserted from the queue into the table according to a different schedule (e.g., independent of when entries are added to the queue). At block 608, the insertion function determines a batch of entries from the queue to be inserted into the certificate revocation table. In embodiments, the queue is a first-in first-out queue and the batch of entries includes a group of the oldest entries in the queue (e.g., the 10 oldest entries in the queue). At block 610, the insertion function inserts the batch of entries into the certificate revocation table.

In embodiments, to insert a batch of entries, the certificate revocation manager (or one or more event-driven functions) determines one or more entries for one or more respective revoked certificates (e.g., certificates that were indicated by the current CRL for a CA) to be inserted into the certificate revocation table. For each of the determined entries, the certificate revocation manager generates a composite key for the entry based at least on a CA identifier and a certificate identifier of the revoked certificate, generates a table entry for the respective revoked certificate that includes the composite key, and causes the table entry to be inserted into the certificate revocation table.

In embodiments, the certificate revocation manager (or one or more event-driven functions) may generate the composite key and save it as part of the queue entry so that the queue entry is already formatted as a table entry (e.g., with a composite key) and may be inserted when the insertion function is executed. In various embodiments, the certificate revocation manager may add values for any number of additional fields of the queue entry that correspond to fields of the certificate revocation table (e.g., additional identifier fields, etc.).

Any of various computer systems may be configured to implement processes associated with the certificate revocation manager, the services, networks, or any components of the above figures. For example, FIG. 7 is a block diagram illustrating an example computer system that implements some or all of the techniques described herein, according to some embodiments.

In various embodiments, the certificate revocation manager, the services, networks, or any components of any of FIGS. 1-6 may each include one or more computer systems 700 such as that illustrated in FIG. 7. In embodiments, the certificate revocation manager, the services, networks, or any components may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the certificate revocation manager, the services, etc.), are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710).

In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 770 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the certificate revocation manager, the services, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a data store comprising a certificate revocation table, the certificate revocation table comprising a plurality of entries that indicate revocation information for a plurality of certificates issued by a plurality of different certificate authorities (CAs); and
one or more computing devices of the provider network to implement a certificate revocation manager, wherein the certificate revocation manager is configured to:
perform, according to a synchronization schedule:
for individual ones of the plurality of CAs:
obtain a current certificate revocation list (CRL) from the CA; and
in response to a determination that the certificate revocation table has not been synchronized with the current CRL obtained from the CA, synchronize the plurality of entries of the certificate revocation table with the current CRL obtained from the CA, wherein one or more additional entries for one or more revoked certificates indicated by the current CRL are inserted into the certificate revocation table to cause the certificate revocation table to comprise both the plurality of entries that existed before the insertion as well as the one or more additional entries indicated by the current CRL obtained from the CA; and
one or more other computing devices of the provider network to implement one or more services that establish connections with clients, wherein individual ones of the one or more services are configured to, for individual client requests to establish a connection:
obtain, from a client certificate provided by the client, a CA identifier of a CA that issued the client certificate and a certificate identifier of the client certificate;
generate a composite key based at least on the CA identifier and the certificate identifier;
perform a lookup on the certificate revocation table based on the composite key; and
based on a result of the lookup, determine whether the client certificate is revoked,
wherein the schedule of obtaining the current CRLs from the CAs and synchronizing the entries of the certificate revocation table occurs independent of the client requests to establish connections.

2. The system of claim 1, wherein to determine whether the client certificate is revoked, wherein the individual ones of the services are configured to:
if the result of the lookup indicates that a matching entry in the certificate revocation table was found, determine that the client certificate is revoked, or
if the result of the lookup indicates that a matching entry in the certificate revocation table was not found, determine that the client certificate is not revoked.

3. The system of claim 1, further comprising one or more additional computing devices of the provider network to implement a queue service, wherein to synchronize the entries of the certificate revocation table with the current CRL obtained from the CA, the certificate revocation manager is configured to:
determine one or more revoked certificates indicated by the CRL that are not indicated by the certificate revocation table;
send respective entries for the one or more revoked certificates to a queue service, wherein the queue service is configured to insert the respective entries into a queue.

4. The system of claim 3, further comprising one or more particular computing devices of the provider network to implement an event-driven compute service, wherein the event-driven compute service is configured to:
execute, based at least on a plurality of entries in the queue, an insertion function,
wherein the insertion function is configured to:
determine one or more of the plurality of entries to be inserted into the certificate revocation table, such that a load on the table will remain below a threshold amount; and
insert the plurality of entries into the certificate revocation table.

5. The system of claim 1, further comprising:
a computing infrastructure collection that comprises the data store and the one or more computing devices;
one or more other computing infrastructure collections that respectively comprise another data store comprising a replica of the certificate revocation table; and
one or more additional computing devices of the provider network to implement a multi-region service, wherein the multi-region service is configured to:
in response to the synchronization of the entries of the certificate revocation table with the current CRLs obtained from the individual ones of the plurality of CAs, wherein the synchronization results in a plurality of new entries in the certificate revocation table:
replicate the plurality of new entries to the one or more replicas of the certificate revocation table in the one or more other computing infrastructure collections.

6. A method, comprising:
performing, by one or more computing devices of a provider network:
perform, according to a synchronization schedule: for individual ones of a plurality of CAs:
obtaining a current CRL from the CA; and
in response to a determination that a certificate revocation table has not been synchronized with the current CRL obtained from the CA, synchronizing a plurality of entries of the certificate revocation table with the current CRL obtained from the CA, wherein one or more additional entries for one or more revoked certificates indicated by the current CRL are inserted into the certificate revocation table to cause the certificate revocation table to comprise both the plurality of entries that existed before the insertion as well as the one or more additional entries indicated by the current CRL obtained from the CA; and
performing, by one or more other computing devices of the provider network:
for individual requests received by a service to establish a connection with a client, performing by the service:
obtaining, from a client certificate provided by the client, a CA identifier of a CA that issued the client certificate and another identifier;
generating a composite key based at least on the CA identifier and the other identifier;
performing a lookup on the certificate revocation table based on the composite key; and
based on a result of the lookup, determining whether the client certificate is revoked.

7. The method of claim 6, wherein determining whether the client certificate is revoked comprises:
  if the result of the lookup indicates that a matching entry in the certificate revocation table was found, determining that the client certificate is revoked, or
  if the result of the lookup indicates that a matching entry in the certificate revocation table was not found, determining that the client certificate is not revoked.

8. The method of claim 7, further comprising:
  in response to determining that the client certificate is revoked, performing one or more of:
    sending, to an endpoint, an indication that the client certificate is revoked or is invalid, or
    rejecting the request to establish the connection.

9. The method of claim 6, wherein synchronizing the entries of the certificate revocation table with the current CRL obtained from the CA comprises:
  determining one or more revoked certificates indicated by the CRL that are not indicated by the certificate revocation table;
  sending respective entries for the one or more revoked certificates to a queue service; and
  inserting, by the queue service, the respective entries into a queue.

10. The method of claim 9, further comprising:
  executing, based at least on a plurality of entries in the queue, an insertion function;
  determining, by the insertion function, one or more of the plurality of entries to be inserted into the certificate revocation table, such that a load on the table will remain below a threshold amount; and
  inserting, by the insertion function, the plurality of entries into the certificate revocation table.

11. The method of claim 6, wherein synchronizing the entries of the certificate revocation table with the current CRL obtained from the CA comprises:
  causing the plurality of entries for revoked certificates indicated by the current CRL to be sent to a queue service for subsequent insertion into the certificate revocation table.

12. The method of claim 11, wherein the current CRL indicates a timestamp or a version number, and wherein determining that the certificate revocation table has not been synchronized with the current CRL comprises:
  determining, based at least on comparison of the timestamp or the version number with another timestamp or another version number in the certificate revocation table, that the certificate revocation table has not been synchronized with the current CRL.

13. The method of claim 6, wherein a computing infrastructure collection comprises the certificate revocation table and the one or more computing devices, another computing infrastructure collection comprises a replica of the certificate revocation table, and further comprising:
  performing, by one or more additional computing devices of the provider network that implement the certificate revocation table as a multi-region table:
    in response to the synchronization of the entries of the certificate revocation table with the current CRLs obtained from the individual ones of the plurality of CAs, wherein the synchronization results in a plurality of new entries in the certificate revocation table:
      replicating the plurality of new entries to a replica of the certificate revocation table in the other computing infrastructure collection.

14. The method of claim 13, further comprising:
  performing, by one or more particular computing devices of the other computing infrastructure collection:
    for individual requests received by a particular service to establish a connection with a particular client, performing by the particular service:
      obtaining, from another client certificate provided by the particular client, another CA identifier of another CA that issued the other client certificate and an additional identifier;
      generating a composite key based at least on the other CA identifier and the additional identifier;
      performing a local lookup on the replica of the certificate revocation
      table based on the composite key; and
      based on a result of the local lookup, determining whether the other client certificate is revoked.

15. One or more non-transitory computer-accessible storage media storing program instructions that when executed on or across one or more processors cause the one or more processors to implement a certificate revocation manager of a provider network to:
  perform, according to a synchronization schedule:
    for individual ones of a plurality of CAs:
      obtain a current CRL from the CA; and
      in response to a determination that a certificate revocation table has not been synchronized with the current CRL obtained from the CA, synchronize a plurality of entries of a certificate revocation table with the current CRL obtained from the CA, wherein one or more additional entries for one or more revoked certificates indicated by the current CRL are inserted into the certificate revocation table to cause the certificate revocation table to comprise both the plurality of entries that existed before the insertion as well as the one or more additional entries indicated by the current CRL obtained from the CA,
  wherein the schedule of obtaining the current CRLs from the CAs and synchronizing the entries of the certificate revocation table occurs independent of client requests to establish connections with at least one service of the provider network, wherein the at least one service performs lookups on the certificate revocation table based on identifiers in client-provided certificates to determine whether the client-provided certificates are revoked.

16. The one or more storage media as recited in claim 15, wherein to synchronize the entries of the certificate revocation table with the current CRL obtained from the CA, the program instructions when executed on or across the one or more processors further cause the one or more processors to:
  cause the plurality of entries for revoked certificates indicated by the current CRL to be sent to a queue service for subsequent insertion into the certificate revocation table.

17. The one or more storage media as recited in claim 16, wherein the current CRL indicates a timestamp or a version number, and wherein to determine that the certificate revocation table has not been synchronized with the current CRL, the program instructions when executed on or across the one or more processors further cause the one or more processors to:
  determine, based at least on comparison of the timestamp or the version number with another timestamp or another version number in the certificate revocation table, that the certificate revocation table has not been synchronized with the current CRL.

18. The one or more storage media as recited in claim 15, wherein to synchronize the entries of the certificate revocation table with the current CRL obtained from the CA, the program instructions when executed on or across the one or more processors further cause the one or more processors to:

determine one or more revoked certificates indicated by the CRL that are not indicated by the certificate revocation table; and send respective entries for the one or more revoked certificates to a queue service of the provider network.

19. The one or more storage media as recited in claim 15, wherein to synchronize the entries of a certificate revocation table with the current CRL obtained from the CA, the program instructions when executed on or across the one or more processors cause the one or more processors to:

determine one or more entries for one or more respective revoked certificates indicated by the current CRL to be inserted into the certificate revocation table; and for individual ones of the entries for a respective revoked certificate to be inserted into the certificate revocation table:

generate a composite key for the entry for the respective revoked certificate based at least on a CA identifier and a certificate identifier of the revoked certificate;

generate an entry for the respective revoked certificate that includes the composite key; and cause the entry to be inserted into the certificate revocation table.

20. The one or more storage media as recited in claim 15, wherein a multi-region service of the provider network implements the certificate revocation table, and wherein to synchronize the entries of the certificate revocation table with the current CRL obtained from the CA, the program instructions when executed on or across the one or more processors further cause the one or more processors to:

determine one or more revoked certificates indicated by the CRL that are not indicated by the certificate revocation table; and cause respective entries for the one or more revoked certificates to be sent to the certificate revocation table implemented by the multi-region service, wherein the multi-region service replicates entries of the certificate revocation table to one or more replicas of the certificate revocation table in one or more remote computing infrastructure collections.

* * * * *